United States Patent
Yamada et al.

[19]

[11] Patent Number: 6,140,794
[45] Date of Patent: Oct. 31, 2000

[54] ENERGIZATION CONTROLLER FOR A PHASE COIL OF AN ELECTRIC MOTOR

[75] Inventors: Daisuke Yamada; Keiichi Yamamoto; Masanori Sugiyama; Hiroyuki Matsubara; Chiaki Honma, all of Aichi-ken, Japan

[73] Assignee: Aisin Seiki Kabushiki Kaisha, Kariya, Japan

[21] Appl. No.: 09/339,231

[22] Filed: Jun. 24, 1999

[30] Foreign Application Priority Data

Jun. 24, 1998 [JP] Japan .................. 10-177706

[51] Int. Cl.[7] .................. H02P 5/28
[52] U.S. Cl. .................. 318/701; 318/439; 318/254
[58] Field of Search .................. 318/254, 701, 318/439

[56] References Cited

U.S. PATENT DOCUMENTS

| | | | |
|---|---|---|---|
| 4,959,596 | 9/1990 | MadMinn et al. | 318/254 |
| 5,142,244 | 8/1992 | Lyons et al. | 318/701 |
| 5,637,974 | 6/1997 | McCann | 318/701 |
| 5,652,494 | 7/1997 | Sugden | 318/701 |
| 5,739,663 | 4/1998 | Brown | 318/701 |
| 5,894,210 | 4/1999 | Brown et al. | 318/701 |

*Primary Examiner*—David Martin
*Assistant Examiner*—Rita Leykin
*Attorney, Agent, or Firm*—Sughrue, Mion, Zinn, Macpeak & Seas, PLLC

[57] ABSTRACT

Angle bounds of a normal energization of the coil of an electric motor are generated in accordance with a combination of a rotation direction and a torque direction of the electric motor. Angle bounds of the decided energization are determined based on a decision of either energization or deenergization of the coil and the detected rotation angle of the rotor. An abnormal condition is determined to exist when the angle bounds of the decided energization are not within the angle bounds of the normal energization.

1 Claim, 8 Drawing Sheets

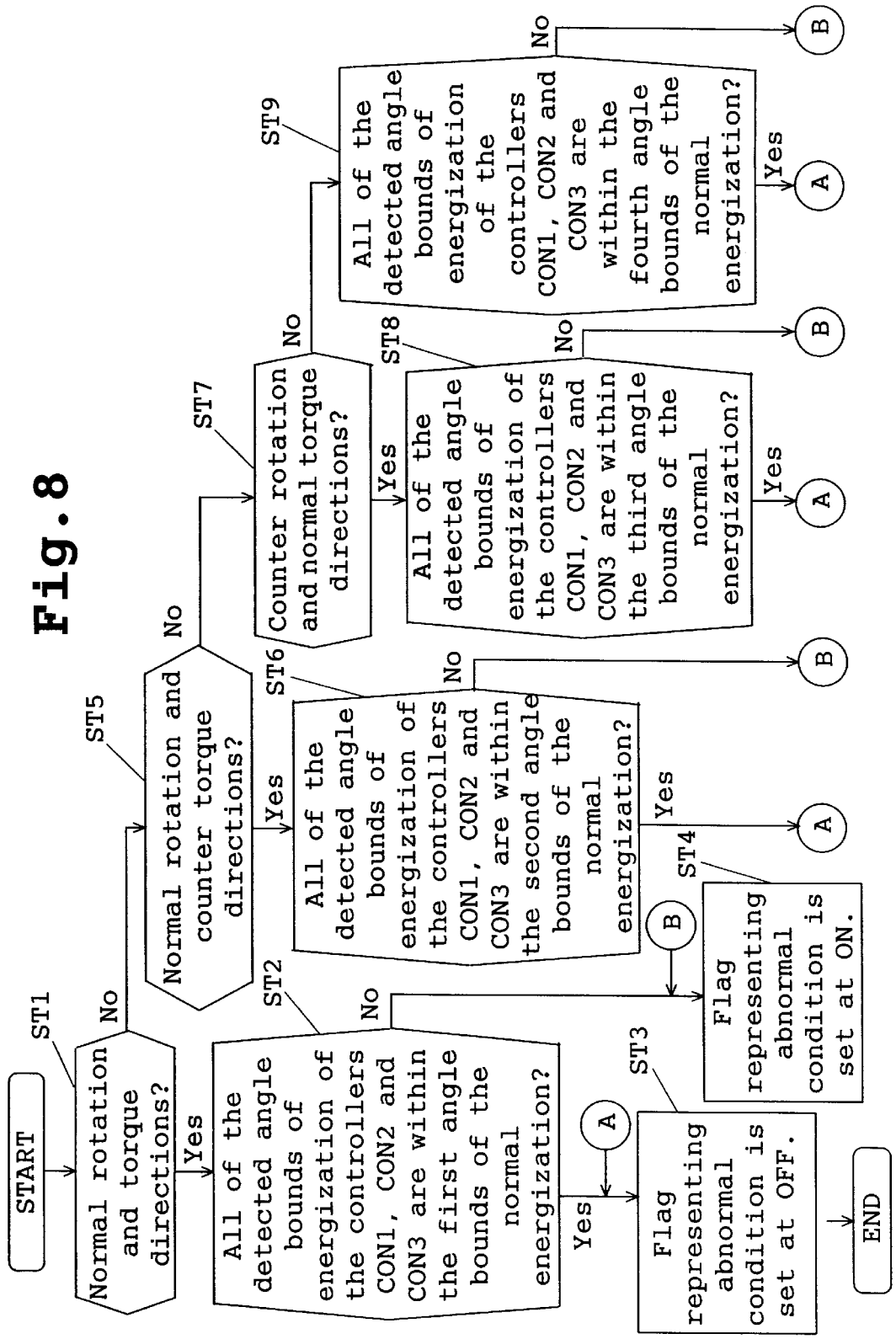

ENERGIZATION CONTROLLER FOR A PHASE COIL OF AN ELECTRIC MOTOR

FIELD OF THE INVENTION

The invention relates to an energization controller for a phase coil of an electric motor, e.g., a switched reluctance motor. The energization controller is used for each of a plurality of phase coils of a stator of the motor so that an abnormal condition can be detected in the controller.

BACKGROUND OF THE INVENTION

A switched reluctance motor (SR motor) is provided with energization controllers for each of a plurality of phase coils of a stator. The energization controller comprises an angle detection means for detecting a rotation angle of a rotor of the SR motor, a means for determining predetermined energization on and off angles on the basis of a rotation speed and a torque of the SR motor, a means for outputting one of the energization on and off angles on the basis of the predetermined energization on and off angles and the rotation angle of the rotor and a coil driver to drive the coil according to an output of the outputting means. In the event of an abnormal condition of the determining and outputting means, the coil would not be energised at an energization on angle which is determined on the basis of a rotation speed and a torque of the SR motor, and/or would not be deenergised at an energization off angle which is determined on the basis thereof. As a result, an expected performance of the SR motor is not achieved and a measure (e.g., stopping of the motor) might be necessary. No prior art for detecting an abnormal condition has been published in the past.

SUMMARY OF THE INVENTION

Accordingly, an object of the invention is to detect an abnormal condition at the determining and outputting means of the energization controller. In accordance with the invention, the energization controller for each of the plurality of phase coils of a stator of an electric motor comprises, a first means for detecting a rotation angle of a rotor of the electric motor, a second means for determining energization on and off angles on the basis of a combination of a rotation speed and a torque of the electric motor, a third means for deciding either an energization or a deenergization of the coil on the basis of the rotation angle of the rotor detected by the first means and the energization on and off angles determined by the second means, a driver for energizing the coil in response to the decision of the third means, a fourth means for generating angle bounds of a normal energization in accordance with a combination of a rotation direction and a torque direction of the electric motor, a fifth means for detecting angle bounds of the decided energization based on a decision of the second means and the rotation angle of the rotor detected by the first means, and a sixth means for deciding whether the angle bounds of the decided energization is within the angle bounds of the normal energization, and deciding an abnormal condition when the former is not within the latter.

According to the invention, the abnormal condition in an energization/deenergization control system is detected, so that a measure can be suitably taken against the abnormal condition.

BRIEF DESCRIPTION OF THE DRAWINGS

FIG. 8 is a flow chart showing a detection process of an abnormal condition in an energization/deenergization system of FIG. 2.

DESCRIPTION OF PREFERRED EMBODIMENT

Figure 1:
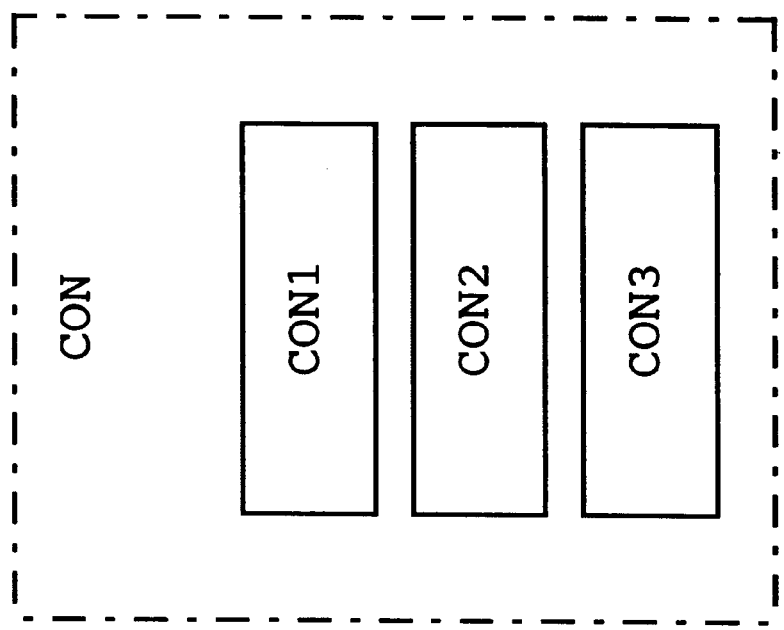
FIG. 1 is a block diagram of an energization controller for a three-phased switched reluctance motor of an embodiment of the invention.

FIG. 1 shows a block diagram of energization controller CON for a three phase switched reluctance motor (SR motor) of an embodiment of the invention. The SR motor can be provided as a drive source for an electric motor vehicle. The controller CON comprises, first, second and third energization controllers CON1, CON2 and CON3 for first, second and third phase coils respectively. Namely the energization controller is provided for each of the plurality of phase coils of a stator of an electric motor. The controllers CON1, CON2 and CON3 are substantially same in construction. An angle sensor RAS, a memory ROM and a microcomputer are commonly used for the energization controllers CON1, CON2 and CON3. The SR motor is provided with twelve magnetic poles on a stator and eight magnetic poles on a rotor.

Figure 2:
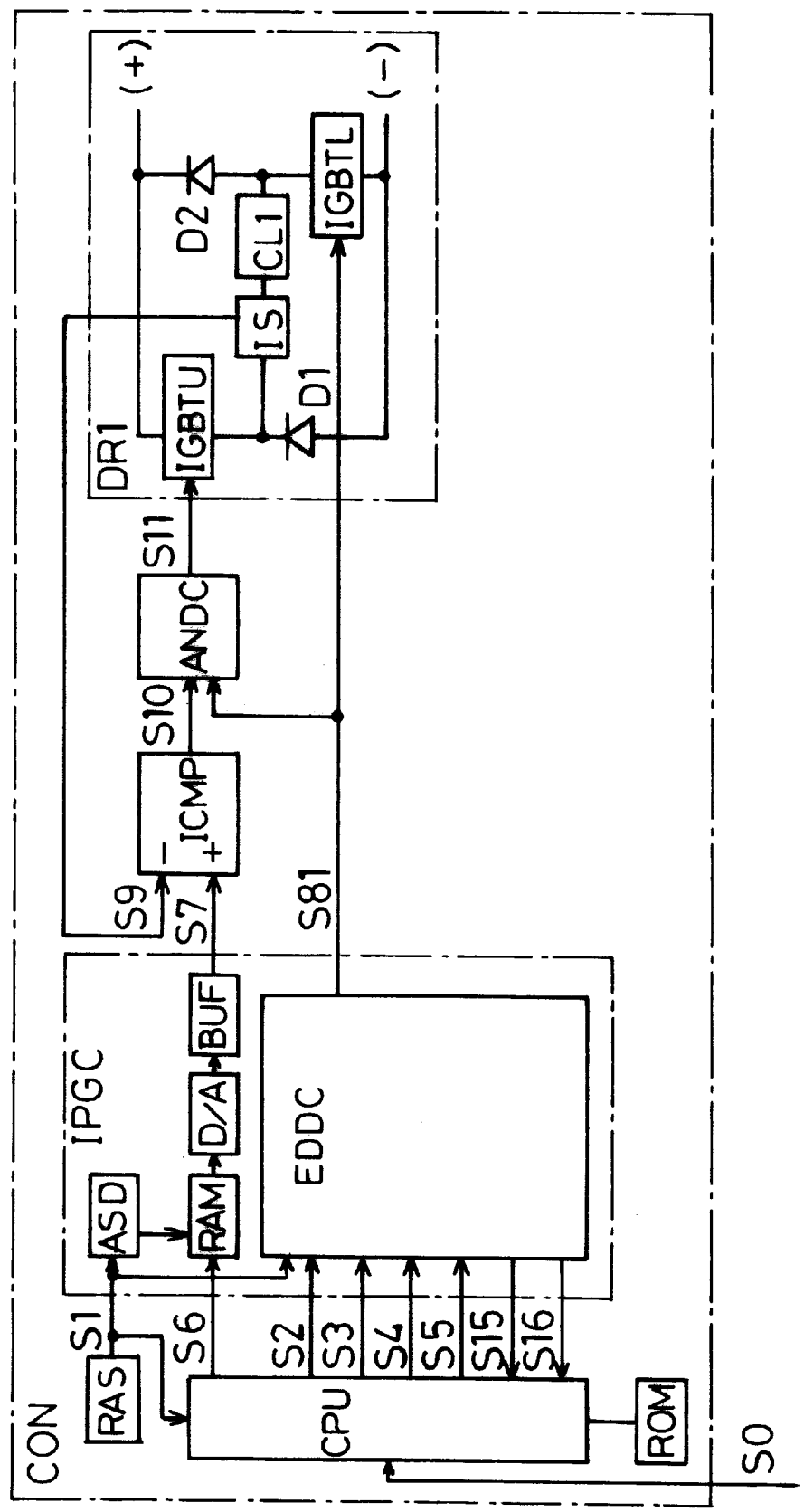
FIG. 2 is a block diagram of an energization controller, in FIG. 1, for a first phase coil.
Figure 4:
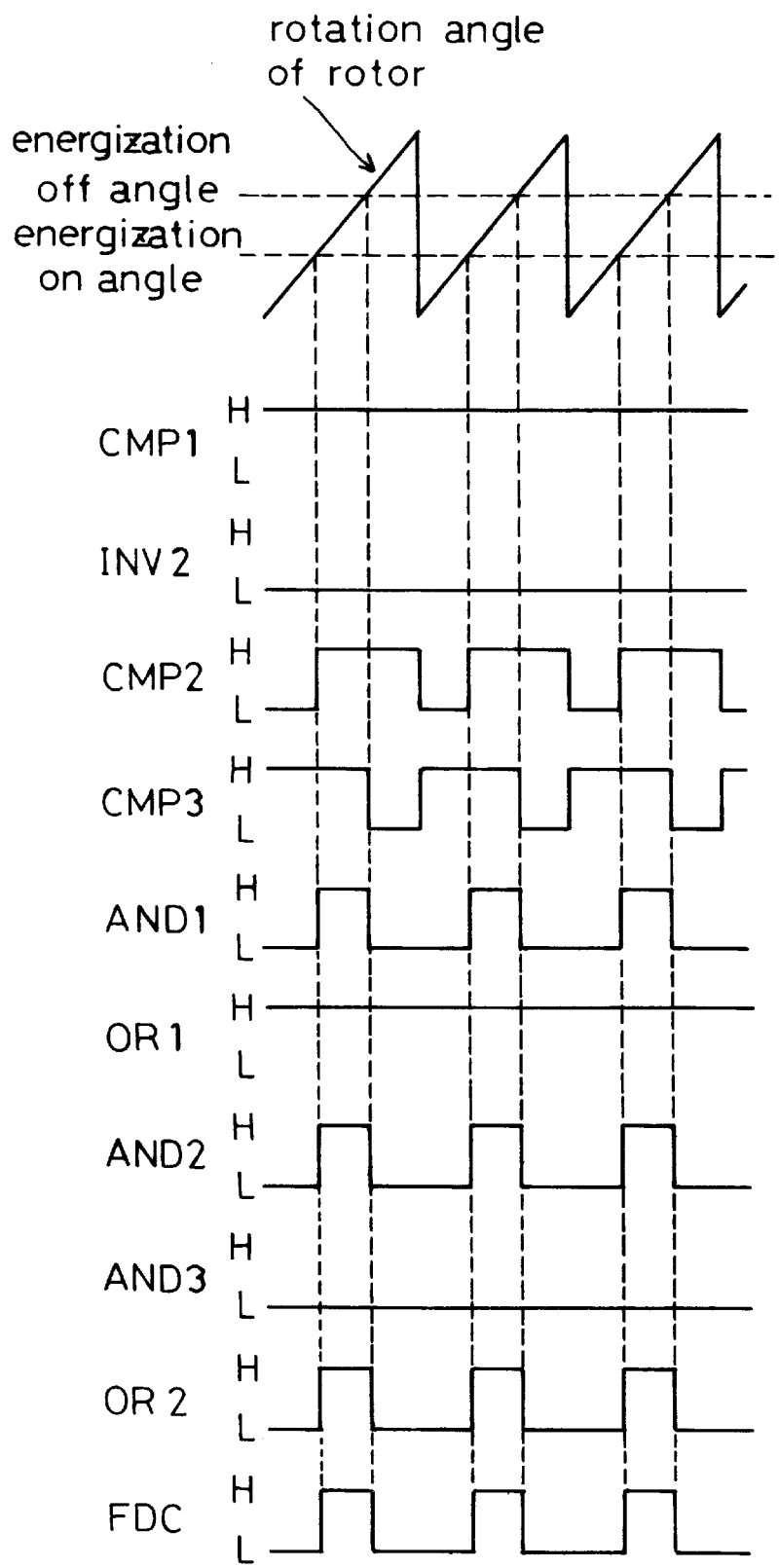
FIG. 4 is a first time chart showing a function of the energization/deenergization decision circuit of FIG. 2.
Figure 5:
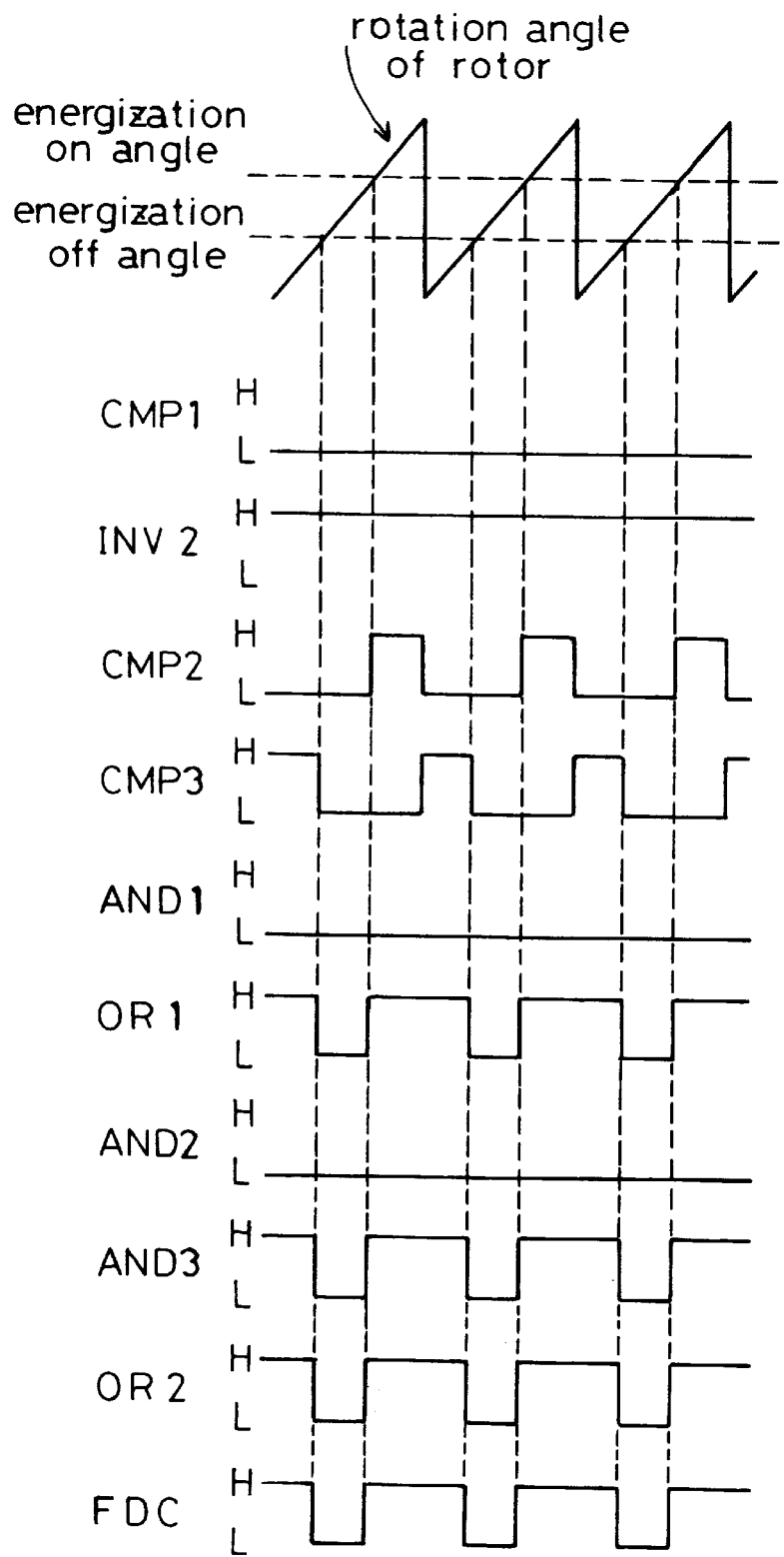
FIG. 5 is a second time chart showing a function of the energization/deenergization decision circuit of FIG. 2.

Referring to FIG. 2, the energization controller CON1 for the first phase coil mainly comprises the angle sensor RAS, the memory ROM, the microcomputer CPU, a current waveform generation circuit IPGC, a comparison circuit ICMP, an output decision circuit ANDC and driver DR1 for the first phase electrical coil CL1. The angle sensor RAS detects a rotation angle of the rotor of the SR motor and outputs a digital signal S1 as the rotation angle to the microcomputer CPU, to an address decoder ASD and an energization/deenergization decision circuit EDDC. The address decoder ASD and the circuit EDDC are comprised in the current waveform generation circuit IPGC. The digital signal Si changes from 0 to 45 degrees in accordance with the change of the rotation angle of the rotor from 0 to 45 degrees and from 46 to 90 degrees respectively. Namely the digital signal S1 shows 1 degree at 1 and 46 degrees of the rotation angle of the rotor. In accordance with a rotation direction of the rotor, the digital signal S1 practically changes 0 to 45 degrees and from 45 to 0 degrees. The memory ROM comprises plural data for the first phase coil, that is, plural pairs of predetermined energization on and off angles and a plurality of current wave forms. The angles and forms correspond to combinations of various rotation speeds in a normal rotation direction and torque in normal and counter rotation directions. The torque in the normal direction is a torque in the direction which is the same as the rotation direction and the torque in the counter direction is a torque in the direction which is counter to the rotation direction. Each of the plural current wave forms corresponds to a data representing a standard current value that should be supplied to the first phase coil at a rotation angle of the rotor, which is detected by the angle sensor RAS. As shown in FIG. 4, an energization off angle is greater than an energization on angle when a torque is in the normal direction. As shown in FIG. 5, an energization on angle is greater than an energization off angle when a torque is in the counter direction. The memory CPU comprises first through fourth predetermined angle bounds of normal energization, which are decided on the basis of combinations of rotation directions and torque directions. The first angle bounds are 12.3 to 44.6 degrees corresponding to the combinations of normal rotation directions and normal torque directions. The second angle bounds are 0 to 22.5 degrees and 34.5 to 44.6 degrees corresponding to the combinations of normal rotation directions and counter torque directions. The third angle bounds are 0 to 32.7 degrees corresponding to the combinations of counter rotation directions and normal torque directions. The fourth angle bounds are 0 to 10.2 degrees and 22.1 to 44.6 degrees corresponding to the combinations of counter rotation directions and counter torque directions. When no abnormal condition is found in the energization controller, the angle bounds of decided energization, where a binary signal 58 is at a high level, must be in the first through fourth angle bounds when the SR motor is driven in the normal rotation and normal torque direction, in the normal rotation direction and the counter torque direction, in the counter rotation direction and normal torque direction and in the counter rotation direction and counter torque direction, respectively.

A main switch is turned on when the electric vehicle is driven. In response to the main switch being turned from off to on, the microcomputer CPU outputs a reset pulse signal S2 and a binary signal S3, which represents the presence of an abnormal condition according to a decision thereof, to the energization/deenergization decision circuit EDDC. A high level of the binary signal S3 represents an absence of an abnormal condition and a low level thereof represents the presence of an abnormal condition. When the decision indicates the absence of an abnormal condition, the microcomputer CPU sequentially calculates a rotation speed (rotation number) and rotation direction on the basis of the digital signal S1 fed from the angle sensor RAS and sequentially calculates a target driving torque (in the normal and counter directions) of the SR motor on the basis of information S0 fed from a shift lever, a brake switch, an accelerator switch and an accelerator opening sensor. The microcomputer CPU reads a pair of energization on and off angles and a current waveform corresponding to the torque and the rotation speed calculated, from the memory ROM. The microcomputer outputs a digital signal S4 as the energization on angle and a digital signal S5 as the energization off angle to the energization/deenergization decision circuit EDDC, and outputs a digital signal S6 as the current waveform to a memory RAM in the current waveform generation circuit IPGC. The microcomputer also reads from the memory of one of the first through fourth normal angle bounds of energization according to a combination of a calculated rotation direction and a calculated torque direction.

The digital signal S6, as the current waveform, outputted from the microcomputer CPU and fed to the memory RAM (namely the data representing a standard current value corresponding to a rotation angle of the rotor) is stored in an address corresponding to the rotation angle of the rotor in the memory RAM. The digital signal S1 as the rotation angle of the rotor outputted from the angle sensor RAS and fed to the address decoder ASD is changed to an address of the memory RAM. Whenever a rotation angle, detected by the angle sensor RAS, of the rotor changes, the current waveform generation circuit IPGC reads a standard current value corresponding to a rotation angle of the rotor from the memory RAM, converts the digital signal to an analogue signal S7 by means of a digital/analogue converter D/A and outputs the analogue signal S7 to the comparison circuit ICMP via an output buffer BUF. The energization/deenergization decision circuit EDDC generates binary signal S81 representing an energization/deenergization of the first phase coil, on the basis of the digital signal S1 outputted from the angle sensor RAS and the digital signals S2 through S5 outputted from the microcomputer CPU, so as to output the binary signal S8 to the output decision circuit ANDC and to a transistor IGBTL, which is one of two transistors (gate insulated bipolar transistor) IGBTU, IGBTL located in the driver DR1 for the first phase electrical coil CL1. A high level of the binary signal S8 represents an energization of the coil and a low level thereof represents a deenergization of the coil.

The driver DR1 for the first phase coil CL1 comprises the transistors IGBTU and IGBTL and diodes D1 and D2. The transistor IGBTU is connected between one end of the coil CL1 and a high potential line of a direct current power supply while the transistor IGBTL is connected between the other end of the coil CL1 and a low potential line of the direct current power supply. The diode D1 is connected between the one end of the coil CL1 and the low potential line of the direct current power supply while the diode D2 is connected between the other end of the coil CL1 and the high potential line of the direct current power supply. A current sensor IS is connected in the signal line joining the one end of the coil CL1 and the transistor IGBTU so as to detect an actual current flow through the coil CL1. The current sensor IS outputs an analogue signal S9 representing the actual current flow to the comparison circuit ICMP. The comparison circuit ICMP compares the analogue signal S7 representing a standard current value which should be supplied to the coil CL1 with the analogue signal S9 representing an actual current value which actually flows through the coil CL1, and outputs a binary signal S10 representing whether the actual current value flowing through the coil CL1 is smaller than the standard current value, to the output decision circuit ANDC. A high level of the binary signal S10 represents that the actual current value flowing through the coil CL1 is smaller than the standard current value while a low level of the signal S10 represents that the actual current value flowing through the coil CL1 is greater than the standard current value.

The output decision circuit ANDC comprises AND gate function and processes the binary signals S8 and S10 so as to generate a binary signal S11. The circuit ANDC outputs the binary signal S11 to the transistor IGBTU of the driver DR1 for the first phase electrical coil CL1. The transistor IGBTU is turned on when the binary signal S11 is at a high level while the transistor IGBTU is turned off when the binary signal S11 is at a low level. The transistor IGBTL is turned on when the binary signal S81 is at a high level while the transistor IGBTL is turned off when the binary signal S81 is at a low level. The transistors IGBTU and IGTBL are both turned off when the signal S81 is at a low level, so that no current flows through the coil CL1. When the binary signal S10 is at a high level, the binary signal S11 is at a high level. Therefore the transistors IGBTU and IGTBL are both turned on when the signals S81 and S10 are both at a high level, so that current flows through the coil CL1. When the binary signal S10 is at a low level, the binary signal S11 is also at a low level. Therefore the transistor IGBTL is turned on when the binary signal S8 is at a high level while transistor IGBTU is turned off when the binary signal S10 is at a low level, so that no current flows through the coil CL1.

As above mentioned, the actual current value is approximated to the standard target value by means of alternate repeat that the transistor IGBTU is turned on and off in accordance with a change of the level of the binary signal S10 while the binary signal S81 is at a high level (the transistor IGBTL is turned on).

Figure 3:
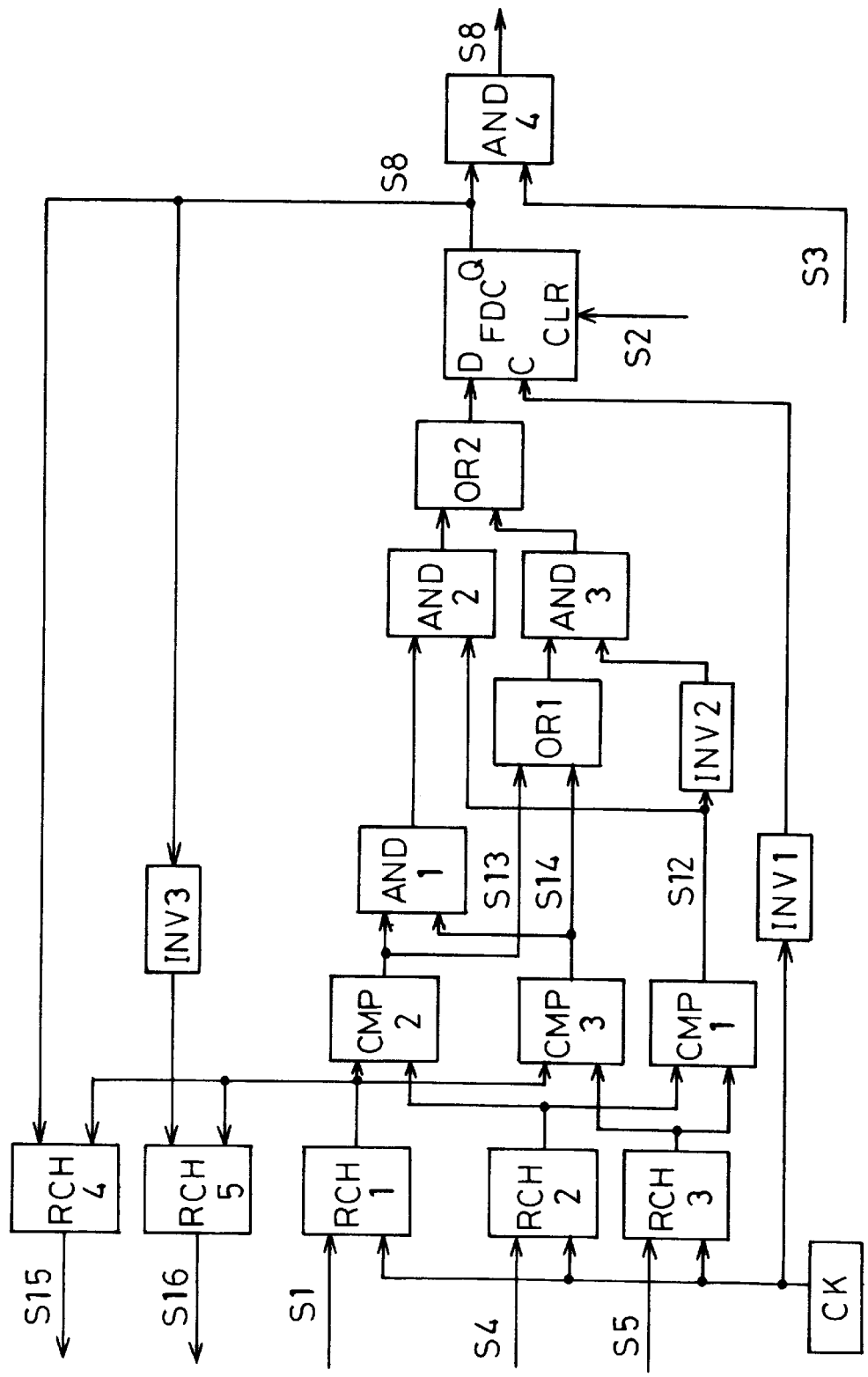
FIG. 3 is a diagram of an energization/deenergization decision circuit of FIG. 2.

The energization/deenergization decision circuit EDDC in the current waveform generation circuit IPGC is specifically explained in construction referring to FIG. 3. The circuit EDDC comprises a clock pulse signal generation circuit CK, five latches RCH1, RCH2, RCH3, RCH4 and RCH5, three comparison circuits CMP1, CMP2, and CMP3, four AND gates AND1, AND2, AND3 and AND4, two OR gates OR1 and OR2, two inverters INV1 and INV2 and flip-flop circuit FDC. The clock pulse signal generation circuit outputs a clock pulse of predetermined frequency (e.g., 16 MHz). The latches RCH1, RCH2 and RCH3 latch the digital signals S1, S4 and S5 respectively in synchronization with a rise of the clock pulse signal outputted from the clock pulse signal generation circuit CK, and output the latched digital signals S1, S4 and S5 respectively. The comparison circuit CMP1 outputs a binary signal S12 in accordance with a comparison between the latched digital signal S4 and the latched digital signal S5. The binary signal S12 represents whether the latched signal S5 representing an energization off angle is greater than the latched signal S4 representing an energization on angle, and a high level of the signal S12 represents that the latched signal S5 is greater than the latched signal S4. The comparison circuit CMP2 outputs a binary signal S13 in accordance with a comparison between the latched digital signal S1 and the latched digital signal S4. The binary signal S13 represents whether the latched signal S2 representing the rotation angle of the rotor is greater than the latched signal S4 representing the energization on angle, and a high level of the signal S13 represents that the latched signal Si is greater than the latched signal S4. The comparison circuit CMP3 outputs a binary signal S14 in accordance with a comparison between the latched digital signal S1 and the latched digital signal S5. The binary signal S14 represents whether the latched signal S1 representing the rotation angle of the rotor is smaller than the latched signal S5 representing an energization off angle, and a high level of the signal S14 represents that the latched signal S1 is smaller than the latched signal S5. The binary signal S13 is fed to one of two input terminals of the AND gate AND1 and to one of two input terminals of the OR gate OR1. The binary signal S14 is fed to the other one of the two input terminals of the AND gate AND1 and to the other one of the two input terminals of the OR gate OR1. The binary signal S12 is fed to one of two input terminals of the AND gate AND2 and to the inverter INV2. Output signal of the inverter INV2 is fed to one of two input terminals of the AND gate AND3. A binary signal outputted from the AND gate AND1 is fed to the other one of the two input terminals of the AND gate AND2. A binary signal outputted from the OR gate OR1 is fed to the other one of the two input terminals of the AND gate AND3. Binary signals outputted from the AND gates AND2 and AND3 are fed to a pair of input terminals of the OR gate OR2. A binary signal outputted from the OR gate OR2 is fed to an input terminal D of the flip-flop circuit FDC. An output of the clock pulse signal generation circuit is inverted at the inverter INV1 and fed to a clock pulse input terminal C of the flip-flop circuit FDC. The reset pulse signal S2 outputted from the microcomputer 13 is fed to a reset pulse input terminal CLR of the flip-flop circuit FDC. The flip-flop circuit FDC outputs the binary signal fed to the input terminal 0, from an output terminal Q in synchronization with a rise of the inverted clock pulse (that is, a fall of the clock pulse) fed to the clock pulse signal input terminal C. A binary signal outputted from the flip-flop circuit FDC is the binary signal S8 and the binary signal S8 is fed to one of the two input terminals of the AND gate AND4. The binary signal S3 outputted from the microcomputer CPU is fed to the other one of the two input terminals of the AND gate AND4. The AND gate AND4 outputs a binary signal S81. While the microcomputer outputs the binary signal S3 at a high level, the output binary signal S8 of the flip-flop circuit FDC coincides with the binary signal S81. The reset pulse signal S2 is fed to the reset pulse input terminal CLR, so that an output of the output terminal Q of the flip-flop circuit FDC is at a low level when the main switch is turned from off to on when the electric vehicle is booted.

Figure 6:
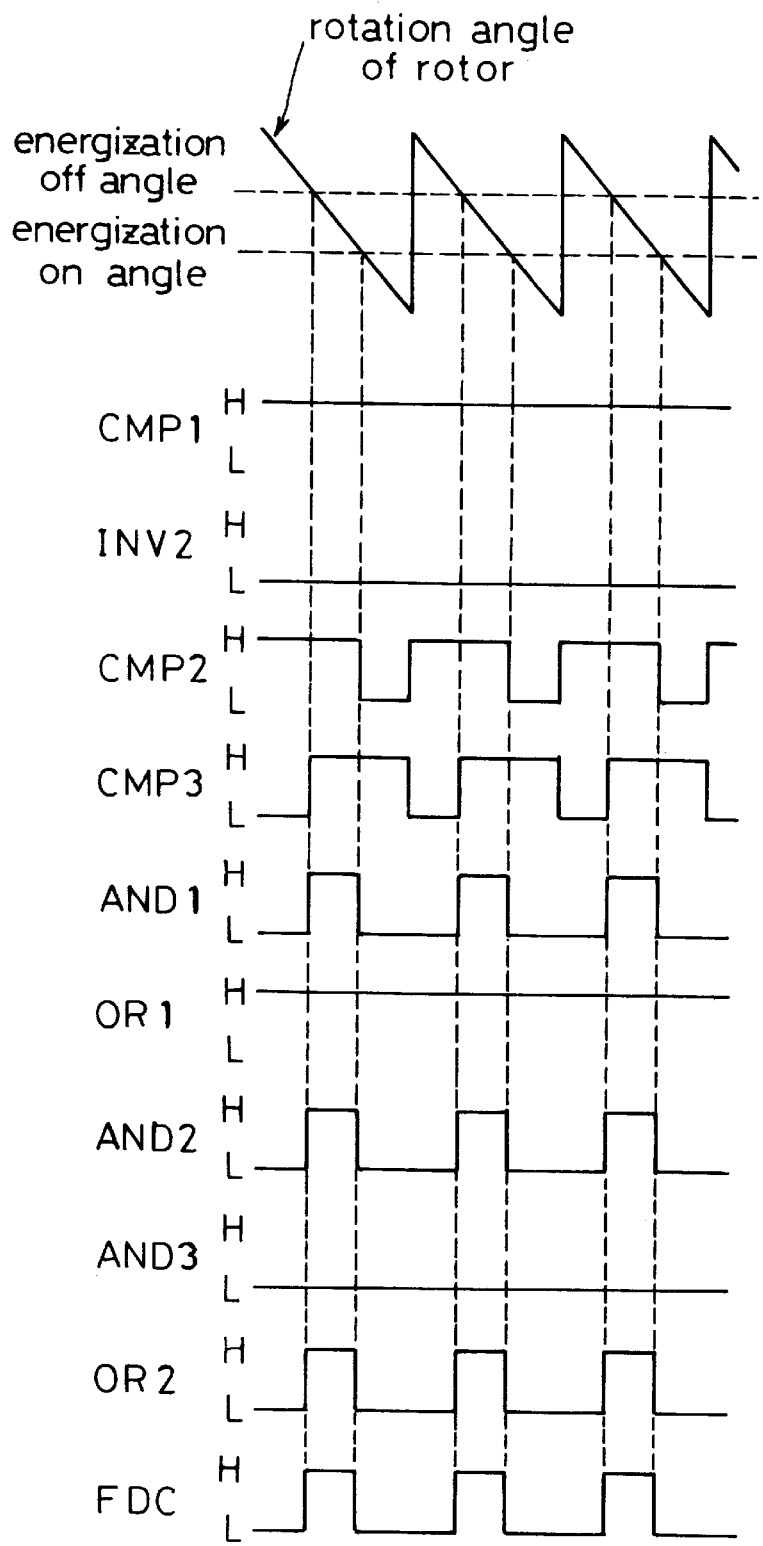
FIG. 6 is a third time chart showing a function of the energization/deenergization decision circuit of FIG. 2.
Figure 7:
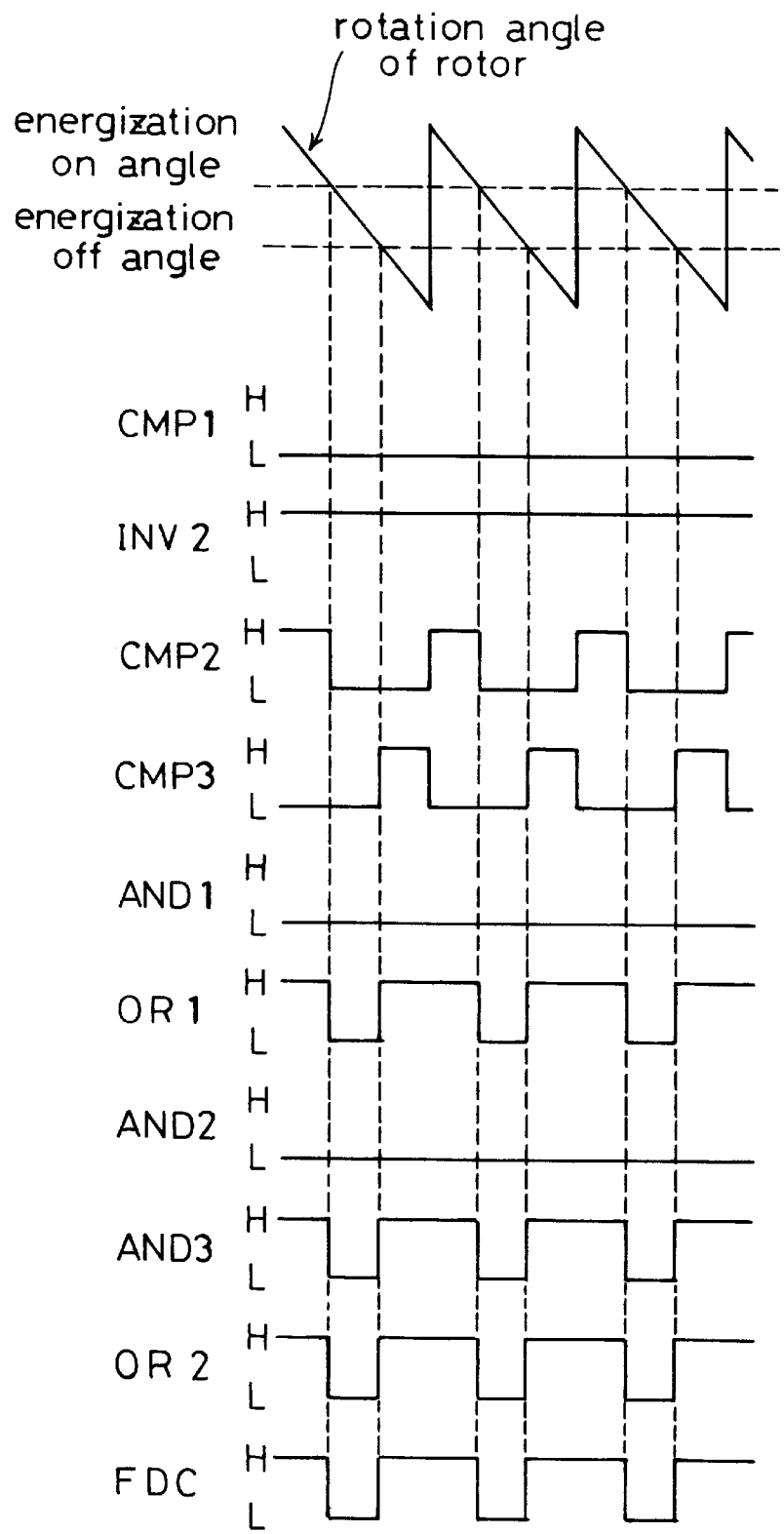
FIG. 7 is a fourth time chart showing a function of the energization/deenergization decision circuit of FIG. 2.

FIG. 4 shows changes of output signals of the comparison circuits CMP1, CMP2 and CMP3, the AND gates AND1, AND2 and AND3, the OR gates OR1 and OR2, the inverter INV1 and INV2 and the flip-flop circuit FDC when the SR motor is driven in the normal rotation direction and in the normal torque direction. FIG. 6 shows changes of output signals of the comparison circuits CMP1, CMP2 and CMP3, the AND gates AND1, AND2 and AND3, the OR gates OR1 and OR2, the inverter INV1 and INV2 and the flip-flop circuit FDC when the SR motor is driven in the normal rotation direction and in the counter torque direction. FIG. 5 shows changes of output signals of the comparison circuits CMP1, CMP2 and CMP3, the AND gates AND1, AND2 and AND3, the OR gates OR1 and OR2, the inverter INV1 and INV2 and the flip-flop circuit FDC when the SR motor is driven in the counter rotation direction and in the normal torque direction. FIG. 7 shows changes of output signals of the comparison circuits CMP1, CMP2 and CMP3, the AND gates AND1, AND2 and AND3, the OR gates OR1 and OR2, the inverter INV1 and INV2 and the flip-flop circuit FDC when the SR motor is driven in the counter rotation direction and in the counter torque direction.

The binary signal S8 is fed to the latch RCH4 and to the latch RCH5 via the inverter INV3 so as to detect an abnormal condition in the energization control system (system to generate the binary signal S8 on the basis of the calculated rotation speed and the target torque of the SR motor). The latch RCH4 latches the digital signal S1 outputted from the latch RCH1 in synchronization with a rise from a low level to a high level of the binary signal S8, and outputs a digital signal S15 as the latched digital signal S1 to the computer CPU. The latch RCH5 latches the digital signal S1 outputted from the latch RCH1 in synchronization with a rise from a low level to a high level of an output signal of INV3 (a fall from a high level to a low level of the binary signal S8), and outputs a digital signal S16 as the latched digital signal S1 to the computer CPU. Namely angle bounds, where the binary signal S8 is at a high level, are detected by means of the latches RCH4 and RCH5 and the inverter INV3, and are notified to the computer.

The microcomputer CPU generates energization on and off angles, a current waveform and angle bounds of the normal energization for the second phase electrical coil in such manner that energization on and off angles, a current waveform and angle bounds of the normal energization for the first phase coil are shifted by a first predetermined shift angle (45/3 degrees). The generated energization on and off angles and current waveform are fed to an energization/deenergization decision circuit and a memory in the energization controller CON2. The microcomputer CPU generates energization on and off angles, a current waveform and angle bounds of the normal energization for the third phase electrical coil in such manner that energization on and off angles, a current waveform and angle bounds of the normal energization for the first phase coil are shifted by a second predetermined shift angle (45/3 degrees). The generated energization on and off angles and current waveform are fed to an energization/deenergization decision circuit and a memory in the energization controller CON3. Each binary signal of the energization controllers CON2 and CON3 corresponding to the binary signal S8 of the energization controller CON1 is also processed and angle bounds, where the each signal is at a high level, are detected and notified to the computer.

The microcomputer CPU periodically executes a process shown in a flow chart of FIG. 8 at a predetermined timing so as to detect an abnormal condition in each of the energization control systems of the energization controllers CON1 CON2 and CON3. At step ST1, it is decided whether the SR motor is driven in the normal rotation direction and in the normal torque direction. If yes, it is decided whether all of the detected angle bounds of decided energization of the controllers CON1, CON2 and CON3 are within the first angle bounds of the normal energization, at step ST2. If yes, a flag representing an abnormal condition is set at OFF status at step ST3. If at least one detected angle bounds of the decided energization of the controllers CON1, CON2 and CON3 is not within the first angle bounds of the normal energization at the step ST2, the flag representing an abnormal condition is set at ON status at step ST4. If the SR motor is not driven in the normal rotation direction and in the normal torque direction at the step ST1, it is decided whether the SR motor is driven in the normal rotation direction and in the counter torque direction at step ST5. If yes, it is decided whether all of the detected angle bounds of decided energization of the controllers CON1, CON2 and CON3 are within the second angle bounds of the normal energization, at step ST6. If yes, the flag representing an abnormal condition is set at OFF status at step ST3. If at least one detected angle bounds of the decided energization of the controllers CON1, CON2 and CON3 is not within the second angle bounds of the normal energization at the step ST6, the flag representing an abnormal condition is set at ON status at step ST4. If the SR motor is not driven in the normal rotation direction and in the counter torque direction at the step ST5, it is decided whether the SR motor is driven in the counter rotation direction and in the normal torque direction at step ST7. If yes, it is decided whether all of the detected angle bounds of energization of the controllers CON1, CON2 and CON3 are within the third angle bounds of the normal energization, at step ST8. If yes, the flag representing an abnormal condition is set at OFF status at step ST3. If at least one detected angle bounds of the decided energization of the controllers CON1, CON2 and CON3 is not within the third angle bounds of the normal energization at the step ST8, the flag representing an abnormal condition is set at ON status at step ST4. If the SR motor is not driven in the counter rotation direction and in the normal torque direction at the step ST7, it is decided whether all of the detected angle bounds of decided energization of the controllers CON1, CON2 and CON3 are within the fourth angle bounds of the normal energization, at step ST9. If yes, the flag representing an abnormal condition is set at OFF status at step ST3. If at least one detected angle bounds of the decided energization of the controllers CON1, CON2 and CON3 is not within the fourth angle bounds of the normal energization at the step ST9, the flag representing an abnormal condition is set at ON status at step ST4. When the flag is set at ON status, the microcomputer CPU turns the binary signal S3 at a low level so as to stop the SR motor.

First, second and third means of the invention correspond to the angle sensor, the memory ROM as well as the microcomputer, and the energization/deenergization decision circuit EDDC except for the AND gate AND4, the latch RCH4 and RCH5 and the inverter INV3, respectively. Fourth, fifth and sixth means of the invention correspond to the memory ROM as well as microcomputer CPU, the latch RCH4 and RCH5 as well as the inverter INV3 of the energization/deenergization decision circuit EDDC, and the microcomputer CPU.

In the above embodiment, the energization on and off angles and the normal rotation direction and the current wave forms are stored in the memory ROM. The microcomputer CPU outputs data read from the memory ROM to the current waveform generation circuit IPGC even when the SR motor is driven in the counter direction, so that the energization or deenergization of the coil is suitably decided at the energization/deenergization decision circuit EDDC in the counter rotation direction. Alternatively, the microcomputer CPU decides a practicable pair of energization on and off angles on the basis of a pair of the energization on and off angles read from the memory ROM according to a decided rotation direction, so as to output the practicable pair to the current waveform generation circuit IPGC. Furthermore, data stored in the memory ROM can correspond to combinations of various rotation speeds in normal and counter rotation directions and torque in normal and counter rotation directions. This invention is applicable not only for an SR motor but other types as well.

While the preferred embodiments have been described, variations thereto will occur to those skilled in the art within the scope of the present inventive concepts which are delineated by the following claim.

What is claimed is:

1. An energization controller for each of a plurality of phase coils of a stator of an electric motor comprising:

a first means for detecting a rotation angle of a rotor of the electric motor, a second means for selecting energization on and off angles corresponding to a combination of a rotation speed and a torque of the electric motor, a third means for deciding either an energization or a deenergization of the coil on the basis of the rotation angle of the rotor detected by the first means and the energization on and off angles determined by the second means, a driver for energizing the coil in response to the decision of the third means, a fourth means for selecting angle bounds of a normal energization according to a combination of a rotation direction and a torque direction of the electric motor, a fifth means for detecting angle bounds of the decided energization based on a decision of the second means and the rotation angle of the rotor detected by the first means, and a sixth means for deciding whether the angle bounds of the decided energization is within the angle bounds of the normal energization, and deciding an abnormal condition exists when the former is not within the latter.

* * * * *